Patented July 12, 1938

2,123,203

UNITED STATES PATENT OFFICE 2,123,203

PROTEIN MINERAL COMPLEX AND PROCESS FOR MAKING SAME

Lloyd K. Riggs, Newark, N. J., and Forest H. Clickner, Chicago, Ill., assignors, by direct and mesne assignments, to Kraft-Phenix Cheese Corporation, a corporation of Delaware No Drawing. Application January 29, 1936, Serial No. 61,318

15 Claims. (Cl. 99—57)

This invention relates to nutritional and therapeutic products made from milk, and the process of producing the same.

More particularly, the invention relates to the recovery and concentration in a pure and stable form of the complex protein mineral components of milk.

A further object of the invention is to produce an edible material derived from milk and having therein, in desired proportions, the effective complex protein mineral component of milk.

It is known that a fermented milk drink called "koumiss" has been used for many years by certain nomad tribes who inhabit the Russian steppes. Koumiss is prepared from mare's milk by fermentation. A similar milk beverage called "kephir" is formed by fermentation set up in cow's milk by a flora similar to that used in koumiss and substantially the same end products are obtained. These tribes found that koumiss, for example, was very efficacious in the treatment of many diseases and ailments. However, in order to obtain the beneficial results it was necessary to consume very large amounts of such beverage apparently because the proportion of the curative substances in the beverage was small.

The most essential ingredients of these fermented milk beverages are complex protein mineral components, especially those containing calcium and phosphorus, and it is from these that the beneficial effects in connection with certain diseases are primarily obtained.

One of the primary objects of the invention, therefore, is the perfection of a process by which these valuable protein mineral components in milk may be separated and utilized in their most effective form.

Another object of the invention is to obtain in a concentrated, pure and stable form, a complex mineral product derived from milk and more particularly derived from whey by precipitation with an alkaline material.

Other objects and advantages of the invention are set forth hereinafter and will be apparent from the following description and claims.

In general, there are two methods for extracting the casein from milk. One of these methods consists in adding rennin to the milk; the rennin coagulates the casein as calcium paracaseinate and permits its separation as curds, leaving a milk serum known as whey. The type of whey produced by this method is called sweet whey. It is produced in certain processes of making cheese.

A second method for separating casein from milk is to cause a coagulation or curdling by means of an acid either added from an external source, such as by means of hydrochloric acid, acetic or preferably lactic acid, or by means of an acid forming bacillus, such as the *Bacillus bulgaricus*, which will form lactic acid in the milk and thus cause the coagulation and separation of the casein from the milk serum. The whey resulting from this second method is acidic and is called sour whey. This type of whey is also produced in the process of making certain cheeses, namely, cottage cheese and to a certain extent, cream cheese. It is also a waste product and previously, at times there has been some difficulty in disposing of it. Either of these types of whey from cheese manufacturing processes, which was formerly considered waste, may be used, or a whey may be produced specifically for the process if the supply of such waste wheys from cheese manufactures is not sufficient.

The coagulation and separation of casein from milk by the rennin method results in the formation of a sweet whey and a certain amount of the desired mineral components, including a protein-mineral component, is lost in the separation. This separation of these components from the sweet whey apparently is of both a mechanical and chemical nature, and the coagulated casein material tends to carry off and also combine with mineral compounds. For example, sweet whey from cheese manufacture has a deficiency in its mineral components of about 40-50% of the mineral content normally present in a milk. This is due to the treatment with rennin which takes from the whey a certain amount of milk minerals. The major portion of this mineral content removed is calcium. Thus, the milk mineral balance in the whey is destroyed and it is deficient in important ingredients. In this state it is not as suitable for nutrition or treatment purposes, from a biological and clinical standpoint, as it is if the remaining milk minerals are present.

On the other hand there is very little loss in milk minerals in producing a sour whey, such as by the lactic acid bacillus or by the direct addition of a coagulating acid. Due to the acid condition of the whey, the milk mineral salts tend to stay in solution in the whey and thus are not separated with the casein.

In carrying out the process, sweet or sour whey may be used; however, it is preferred to use sour whey as this material has a greater percentage of the complex mineral components which are desirable to recover in a pure and stable form.

It has heretofore been proposed to obtain a precipitate from whey by means of an alkaline material. In these prior processes, it was not understood how the ratio of the mineral component and the protein component could be varied or controlled, and as a result the protein component in all of these materials was very high. This high protein content tended to affect the stability of the product and imparted flint-like and other undesirable properties to the product.

The hard flint-like characteristic of the product makes pulverization difficult without impairing the product. Also this type of product will not easily remain in suspension with the result that when it is employed in beverages, it settles before the beverage can be conveniently consumed.

A further object of the invention, therefore, is to produce a complex protein mineral compound of milk, in which the ratio of the protein to the mineral components is such as to give unusual stability to the product and to impart a desirable appearance and texture as well as proper nutritional properties.

When sour whey is used directly the precipitates obtained by alkalinizing whey according to methods taught in the prior art contained an undesirably high percentage of protein. It was common to obtain precipitates having as high as 50% protein. In the process according to this invention, the proportion of protein in the whey is reduced before the complex mineral material is precipitated from whey. This may be done by coagulating or carefully filtering some of the protein from some or all of the whey to remove some of the protein material prior to the precipitation. This coagulation method is preferred and this is most effectively carried out by heating the whey; all of the protein which is coagulable by heat is precipitated and may be quickly separated by filtration. If the amount of protein removed is too great, the proper proportion can be restored by mixing suitable proportions of raw and heated whey. The mixing of the heated and raw whey provides a convenient method of producing a material having the desired protein content, and by this method the protein content may be varied as desired for products of different nutritional properties. The whey in which the protein content has been reduced may then be treated with an alkaline material to precipitate the complex protein mineral product.

The characteristics of a precipitate obtained from unboiled whey have been found undesirable for certain uses, as has been pointed out heretofore. We have found, however, that these characteristics can be eliminated by blending the unboiled whey prior to precipitation, with boiled whey and that within relative wide limits the precipitate resulting from such a mixture will have the desirable characteristics of a boiled whey precipitate.

In these prior processes, also, the operative conditions and the control factors under which a pure and stable product could be obtained also were not understood, and as a result the precipitate was not stable and was contaminated with decomposition products to render it dark in color and objectionable as to odor and taste.

The production of a calcium protein material with these objectionable properties is largely due to the improper conditions which were maintained at the time of the precipitation and due to the length of time which was permitted to elapse between the time the alkaline material was added to the whey and the completion of the steps necessary to present the material in dry form.

It is an object of the invention, therefore, to precipitate the material under conditions which will permit it to be immediately and rapidly separated, and to then separate the precipitate in a relatively short time.

In carrying out the process comprising the invention, the whey, after having the protein content reduced, is heated and the alkaline material is added while the whey is hot. The precipitate thereby obtained rapidly separates in a form which is readily filterable.

In conventional cheese making processes, cream and milk are mixed to provide a butterfat content of about 8 to 14%, and the mixture is viscolized to form a good emulsion of the milk and cream. The mixture is pasteurized after which an acid producing bacterial culture is added. When the desired acidity has developed, which normally is such that about 9 cc. of the mixture is neutralized by about .85 cc. of normal alkali solution, common salt is added in the proportion of about 12 pounds to 1000 pounds of the mixture. The mixture is heated, preferably to a pasteurization temperature, to produce the desired texture in the curds, and when the proper texture has been developed, the mixture is cooled, and the curds are separated by filtration. The whey that remains is employed in producing the protein calcium precipitate.

It is to be understood that whey, which has been produced by any other process, for example by the treatment of skim milk, may be used as a source of the protein calcium material, and that milk may be specifically treated to yield the whey. The whey produced by a cheese making process of the type described heretofore is readily available and for that reason it is preferred.

The whey, after separation from the curds, is referred to as "raw" whey. The raw whey is then heated to coagulate the heat coagulable protein. A temperature at, or approaching, the boiling point is preferred. This may be done conveniently by means of steam coils, or steam may be introduced directly into the whey. As a result of this heating, all of the coagulable protein is precipitated; the acidity of the whey is also lowered slightly. The boiled whey is filtered to remove the coagulated protein and the filtrate is a clear whey of much the same appearance as raw whey.

The heated whey alone may be used to prepare the protein calcium material. If this is done, the material will be higher in mineral components and relatively lower in protein components. If a higher ratio of protein is desired, raw whey may be mixed with the boiled whey and the mixture used to prepare the protein calcium material. A mixture, which produces a particularly desirable product, and which is described as the preferred embodiment comprises 5 parts of heated and filtered whey, and 1 part of raw whey. If a precipitate higher in protein is desired a larger proportion of raw whey may be used, for example, 3 or 4 parts of heated whey to 1 part of raw whey. If a product higher in calcium than the preferred embodiment is desired, 6 to 10 or more parts of heated whey may be mixed to 1 part of raw whey.

The heated whey or the mixture of heated and raw whey which is to be employed for preparing the protein calcium precipitate is heated as rapidly as possible until it approaches or reaches the boiling point. A preferable method of heating the whey consists in introducing steam directly into it. As soon as the whey is heated, an alkaline material, preferably sodium carbonate, is added. The amount added is that which will produce a very slight pink color with phenolphthalein. This corresponds to a pH value of about 8.3. In the preferred embodiment about 3½ pounds of sodium carbonate will be required for 1,000 pounds of whey. As soon as the neutralization is complete, the heat is withdrawn, and the precipitate quickly settles. The supernatent liquid is then decanted, and the remaining mixture is filtered. A centrifuging operation may also be employed. The precipitate is washed by means of cold water until the wash water contains no lactose. The precipitate is then broken into small pieces and dried by means of air heated to a temperature of 100–180° F., preferably heated to a temperature of 150 to 160° F. As soon as the material is dried, it is ground to the desired fineness, preferably so that it will pass a 100 mesh sieve.

In carrying out the process, it is important that the neutralization be accurate. If a smaller amount of alkali is used than that indicated, the yield will be smaller, and the proportions of the protein and calcium in the precipitate may be altered considerably. If too large a quantity of alkali is used, a dark colored malodorous product will be obtained, which is not suitable for use as a food.

It is also important that the precipitate be separated from the liquid and dried as quickly as possible. If it remains in contact with the liquid too long, a portion of it will be decomposed, yielding a dark colored, malodorous material. It is important, therefore, to filter, wash and dry the material in the shortest possible time. Particularly is it important to separate the precipitate from the mother liquor rapidly.

It has been found that by heating the mixture prior to the addition of the alkaline precipitating agent, the character of the precipitate formed is such that it will settle rapidly so that the greater portion of the liquid may be decanted. The quantity of the mixture to be filtered is, therefore, small and the time required for filtering is greatly reduced. The character of the precipitate is also affected somewhat by the heating prior to neutralization. The precipitate forms in larger floccules of greater density which are more easily filterable. If the alkaline precipitating agent is added when the whey is cold, or at room temperature, the precipitate will not settle quickly. As a result, if sufficient time elapses to allow this precipitate to settle, the precipitate will have remained in contact with the liquid too great a time to produce a pure product. If the entire quantity of the mixture is filtered, the time required to filter will be so great that a portion of the precipitate will be decomposed. In either case it is unfit as a food. In addition, when the precipitation is carried out in the cold, the precipitate is of a fine and flocculent nature which is extremely difficult to filter.

In all of the operations after the precipitation, rapidity is important. The precipitate should be transferred to the filter press within as small a time as possible after it is formed, and should be washed as quickly as possible. The time for drying should not be longer than that necessary for the complete removal of the water inasmuch as the drying for an additional time tends to turn the product dark in color. During the grinding operation, care should be taken to avoid the production of frictional heat which will deleteriously affect the product.

Any alkaline material may be employed for precipitating the protein mineral complex, for example, the hydroxides, carbonates and bicarbonates of the alkali and alkaline earth metals, as well as of ammonium. Organic bases also may be employed.

The product in all cases will be a light, creamy white colored material. The texture will vary somewhat with the composition; in all cases it will be fine and fluffy. The product containing a higher portion of calcium will be more chalky in character and softer, whereas the product containing the higher proportion of protein will be somewhat more brittle. The material has no odor, and has practically no taste. It is insoluble in water, alcohol or other organic solvents. It is decomposed by boiling in the presence of alkali. The precipitate is somewhat soluble in an acid solution from which it may be reprecipitated in approximately its original form, by reneutralization. By such a reprecipitation operation, the compound may be further purified, should this be desired.

The composition of the product will vary somewhat depending upon the character of the whey employed. This in turn will vary somewhat upon the source of the milk, inasmuch as it is well known that the mineral content of milk has a seasonal variation depending upon the type of food supplied to the cows from which the milk is obtained. A product with a constant calcium content composition can be obtained by varying the proportions of raw and heated whey to offset the seasonal and geographical variations. The product obtained from a mixture of 5 parts of heated whey with 1 part of raw whey will have an ash content of about 62%, and a protein content of about 14%. These figures will vary somewhat depending upon the type of whey used and the ash content may vary 10% below and above the stated figure. The protein may vary 5% below and above the stated figure. If all boiled whey is used an ash content of about 70% and a protein content of about 11% will be obtained. This will also be subject to the same variations depending upon the source of the whey. In the modification of the process employing a larger proportion of the raw whey, for example, 3 parts of heated whey and 1 part of raw whey, the ash content will be about 50% and the protein content about 23%. These proportions are subject to the same variations. The remainder of the composition in all instances comprises any moisture that is not removed in the drying process (usually several per cent) and small amounts of organic material, such as fat and organic acids.

The combination between the protein and calcium is believed to be at least in part a chemical combination. It has not been ascertained if the protein and calcium combine in different proportions and if so, the extent of the different combinations. It is possible that they combine in at least one proportion and that variations from such a proportion or proportions represent protein or calcium in a mechanical combination.

The ash is comprised primarily of calcium and phosphorous with very small amounts of salts of alkaline earth and alkali metals. The ratio of calcium and phosphorus to the ash content tends to be constant irrespective of the variations in the ratio of protein to ash. The calcium content of the ash, calculated as calcium oxide, will be about 48%–52%, generally around 50%, and the phosphorus content, calculated as phosphorus pentoxide, will be about 39%–43%, generally around 41%. The balance of the ash is composed primarily of salts of the alkali and alkaline earth metals.

It will be obvious that many steps in the process as well as the materials used will have equivalents, and all such are intended to be included in the invention as defined in the following claims:

We claim:

1. A method of preparing a nutritive mineral product from whey resulting from the acidic separation of casein, which method comprises coducing the protein content in the whey, adding to the whey in a heated condition the minimum quantity of an alkaline material necessary to precipitate a complex protein mineral material, and immediately separating and drying the precipitate, whereby a stable material is obtained substantially free from products of decomposition.

2. A method of preparing a nutritive mineral product from whey resulting from the acidic separation of casein, which method comprises coagulating the heat coagulable protein from at least a portion of the whey and removing the coagulated protein, adding to the whey in a heated condition the minimum quantity of an alkaline material necessary to precipitate a complex protein mineral material, and immediately separating and drying the precipitate, whereby a stable material is obtained substantially free from products of decomposition.

3. A method of preparing a nutritive mineral product from whey resulting from the acidic separation of casein, which method comprises eliminating a portion of the protein from the whey, adding to the whey in a heated condition the minimum quantity of an alkaline material necessary to precipitate a complex protein mineral material, and immediately separating and drying the precipitate, whereby a stable material is obtained substantially free from products of decomposition.

4. A method of preparing a nutritive mineral product from whey resulting from the acidic separation of casein, which method comprises coagulating at least a portion of the protein in the whey and removing the coagulated protein, adding to the whey in a heated condition the minimum quantity of an alkaline material necessary to precipitate a complex protein mineral material, and immediately separating and drying the precipitate, whereby a stable material is obtained substantially free from products of decomposition.

5. A method of preparing a nutritive mineral product from whey resulting from the acidic separation of casein, which method comprises heating the whey to coagulate heat coagulable protein therein, removing the coagulated protein, adding to the whey in a heated condition the minimum quantity of an alkaline material necessary to precipitate a complex protein mineral material, and immediately separating and drying the precipitate, whereby a stable material is obtained substantially free from products of decomposition.

6. A method of preparing a nutritive mineral product from whey resulting from the acidic separation of casein, which method comprises heating the whey to coagulate the protein therein, separating the coagulated protein by filtration, mixing the heated and filtered whey with raw whey, adding to the mixture in a heated condition the minimum quantity of an alkaline material necessary to precipitate a complex protein mineral material, and immediately separating and drying the precipitate, whereby a stable material is obtained substantially free from products of decomposition.

7. A method of preparing a nutritive mineral product from whey resulting from the acidic separation of casein, which method comprises heating the whey to coagulate the protein therein, separating the coagulated protein by filtration, mixing about five parts of the heated and filtered whey with about one part of raw whey, adding to the mixture while in a heated condition the minimum quantity of an alkaline material necessary to precipitate complex protein mineral material, and immediately separating, washing, and drying the precipitate, whereby a stable material is obtained substantially free from products of decomposition.

8. A method of preparing a nutritive mineral product from whey resulting from the acidic separation of casein, which method comprises eliminating the protein from at least a portion of the whey, adding to the whey in a heated condition the minimum quantity of an alkaline compound of an alkali metal necessary to precipitate a complex protein mineral material, and immediately separating, washing, and drying the precipitate, whereby a stable material is obtained substantially free from products of decomposition.

9. A method of preparing a nutritive mineral product from whey resulting from the acidic separation of casein, which method comprises eliminating a portion of the protein from the whey, adding to the whey while in a heated condition the minimum quantity of sodium carbonate necessary to precipitate a complex protein mineral material, and immediately separating, washing, and drying the precipitate, whereby a stable material is obtained substantially free from products of decomposition.

10. A method of preparing a nutritive mineral product from whey resulting from the acidic separation of the casein, which method comprises heating the whey to coagulate the protein therein, separating the coagulated protein by filtration, mixing about five parts of the heated and filtered whey with about one part of raw whey, adding to the mixture while in a heated condition the minimum quantity of sodium carbonate necessary to precipitate a complex protein mineral material, and immediately filtering, washing, and drying the precipitate, whereby a stable material is obtained substantially free from products of decomposition.

11. A method of preparing a nutritive mineral product from whey resulting from the acidic separation of casein, which method comprises eliminating the protein from at least a portion of the whey, adding to the whey in a heated condition the minimum quantity of an alkaline compound of an alkali metal necessary to precipitate complex protein mineral material, decanting the supernatant liquid, and immediately filtering, washing, and drying the precipitate, whereby a stable material is obtained substantially free from products of decomposition.

12. A substantially dry, stable, complex mineral alkaline precipitated milk product substantially white in color, odorless and free from decomposition products of unstable protein substances, comprising 50% to 72% mineral components and 12% to 23% protein.

13. A substantially dry, stable, complex mineral alkaline precipitated milk product substantially white in color, odorless and free from decomposition products of unstable protein substances, comprising 58% to 66% mineral components and 14% to 18% protein.

14. A substantially dry, stable, complex mineral alkaline precipitated milk product substantially white in color, odorless and free from decomposition products of unstable protein substances, comprising protein, calcium, and phosphorus; the protein being present in the amount of 12 to 23 per cent, the calcium in an amount identifiable as 25 to 37 per cent calcium oxide, and the phosphorus in an amount identifiable as 21 to 33 per cent phosphorus pentoxide.

15. A substantially dry, stable, complex mineral alkaline precipitated milk product substantially white in color, odorless and free from decomposition products of unstable protein substances, comprising protein, calcium, and phosphorus; the protein being present in the amount of 14 to 18 per cent, the calcium in an amount identifiable as 29 to 33 per cent calcium oxide, and the phosphorus in an amount identifiable as 25 to 29 per cent phosphorus pentoxide.

LLOYD K. RIGGS.
FOREST H. CLICKNER.